(12) United States Patent
Shute et al.

(10) Patent No.: US 7,377,050 B2
(45) Date of Patent: May 27, 2008

(54) TAPE MEASURE

(75) Inventors: Matthew Shute, Charlotte, NC (US);
Steven R. Levine, Mooresville, NC (US)

(73) Assignee: Irwin Industrial Tool Company, Huntersville, NC (US)

(*) Notice: Subject to any disclaimer, the term of this patent is extended or adjusted under 35 U.S.C. 154(b) by 17 days.

(21) Appl. No.: 11/278,464

(22) Filed: Apr. 3, 2006

(65) Prior Publication Data

US 2007/0227029 A1    Oct. 4, 2007

(51) Int. Cl.
*G01B 3/10* (2006.01)
(52) U.S. Cl. ........................................ 33/761
(58) Field of Classification Search ............ 33/757, 33/759, 760, 761, 769
See application file for complete search history.

(56) References Cited

U.S. PATENT DOCUMENTS

| | | | |
|---|---|---|---|
| 1,402,589 A | 1/1922 | Farrand | |
| 1,730,199 A | 10/1929 | Farrand | |
| 2,695,454 A | 11/1954 | Dart | |
| 3,716,201 A | 2/1973 | West | |
| 3,874,608 A | 4/1975 | Quenot | |
| 4,155,168 A | 5/1979 | DuBois | |
| 4,487,379 A | 12/1984 | Drechsler et al. | |
| 4,578,867 A | 4/1986 | Czerwinski et al. | |
| 4,649,649 A | 3/1987 | Fain | |
| 4,756,087 A | 7/1988 | Sing | |
| 4,766,673 A | 8/1988 | Bolson | |
| 4,907,348 A | 3/1990 | Hubbard, Jr. | |
| 4,914,830 A | 4/1990 | Legare | |
| 4,972,600 A | 11/1990 | Nosek | |
| 4,976,048 A | 12/1990 | Blackman | |
| 5,210,956 A | 5/1993 | Knispel et al. | |
| 5,367,784 A | 11/1994 | Krebs | |
| 5,400,520 A * | 3/1995 | Hillinger | 33/761 |
| 5,440,820 A | 8/1995 | Hwang | |
| 5,575,077 A | 11/1996 | Jung Tae | |
| 5,624,085 A | 4/1997 | Usami | |
| 5,768,797 A | 6/1998 | Trevino | |
| 5,806,202 A | 9/1998 | Blackman et al. | |
| 6,226,886 B1 | 5/2001 | Lamond et al. | |

(Continued)

FOREIGN PATENT DOCUMENTS

GB    2042731    9/1980

(Continued)

OTHER PUBLICATIONS

GB Search Report under Section 17(5) dated May 18, 2007.

(Continued)

*Primary Examiner*—G. Bradley Bennett
(74) *Attorney, Agent, or Firm*—Dennis J. Williamson; Matthew W. Witsil; Moore & Van Allen PLLC

(57) ABSTRACT

A tape measure housing is comprised of two asymmetrical housing portions. The first housing portion comprises a receptacle in which the tape measure components are located. The second housing portion comprises a cover that encloses the first portion along a seam that is asymmetrically disposed on the assembled housing. The housing portions are weighted such that the center of gravity of the housing is oriented so that the housing will assume a predetermined orientation when dropped from a height.

23 Claims, 7 Drawing Sheets

U.S. PATENT DOCUMENTS

| | | |
|---|---|---|
| 6,249,986 B1 | 6/2001 | Murray |
| 6,256,901 B1 | 7/2001 | Lin |
| 6,463,670 B1 | 10/2002 | Usami |
| 6,581,296 B2 | 6/2003 | Ponce |
| 6,637,125 B2 | 10/2003 | Scarborough |
| 6,643,947 B2 | 11/2003 | Murray |
| 6,718,649 B1 | 4/2004 | Critelli et al. |
| 6,766,588 B1* | 7/2004 | Hsu .................. 33/761 |
| 6,857,198 B1* | 2/2005 | Lin .................. 33/769 |
| 2002/0004993 A1 | 1/2002 | Usami |
| 2002/0088136 A1 | 7/2002 | Tseng |
| 2003/0000099 A1* | 1/2003 | Wang .................. 33/760 |
| 2004/0211856 A1 | 10/2004 | Blackman et al. |
| 2005/0210697 A1* | 9/2005 | Lee .................. 33/767 |
| 2005/0253011 A1 | 11/2005 | Liao |
| 2005/0262717 A1* | 12/2005 | Chen .................. 33/761 |
| 2006/0038050 A1* | 2/2006 | Hui .................. 33/769 |

FOREIGN PATENT DOCUMENTS

| | | |
|---|---|---|
| JP | 2000258103 | 9/2000 |
| JP | 2000298002 | 10/2000 |

OTHER PUBLICATIONS

UK Search Report dated Nov. 12, 2007.

* cited by examiner

TAPE MEASURE

BACKGROUND

The invention relates generally to tape measures and, more particularly, to an improved tape measure and housing.

It will be appreciated that tape measures typically comprise a tape wound on a reel that is rotatably supported in a housing. The tape may consist of a steel blade, a plastic or fiberglass ribbon or other relatively flexible material that can be wound on the reel. The tape has measurement indicia thereon such that it can be unwound from the reel and extended from the housing to measure linear distances. The tape may be rewound on the reel manually using a crank or automatically such as by using a spring. The exposed end of the tape typically includes an end hook for temporarily attaching the end of the tape to an article during use and for preventing the end of the tape from being wound all of the way into the housing.

As will be appreciated tape measures are often used in relatively harsh environments such as construction sites, industrial sites and other work sites. As a result tape measures are subject to impacts as a result of being dropped or otherwise struck. Most tape measure housings consist of a plastic or metal housing that comprises two substantially identical clam shell halves where the halves are joined together along a center line of the device and are secured together by screws, rivets or other fasteners. Existing tape measure housings are prone to failure as a result of being dropped or otherwise impacted because the tape measure housing is subjected to shear forces along the seam where the two housing halves are joined together that cause the connection between the housing halves to fail. As a result, the end user may be forced to prematurely replace the tape measure.

Thus, an improved tape measure and tape measure housing is desired.

SUMMARY OF THE INVENTION

The invention comprises a tape measure housing comprised of two asymmetrical housing portions. The first housing portion comprises a housing base in which the tape measure components are located. The second housing portion comprises a housing cover that encloses the first portion along a seam that is asymmetrically disposed on the assembled housing. The housing is weighted to locate the center of gravity of the tape measure such that the housing will assume a predetermined orientation when dropped from a height. By doing so, the housing will impact the ground in a predetermined orientation where it can best absorb the impact with the ground without being damaged. A shock resistant material may also be formed on the housing to absorb the impact. The shock resistant material may be located such that it is disposed in a predetermined relationship relative to the location of the center of gravity.

DETAILED DESCRIPTION OF PREFERRED EMBODIMENTS OF THE INVENTION

Figure 1:
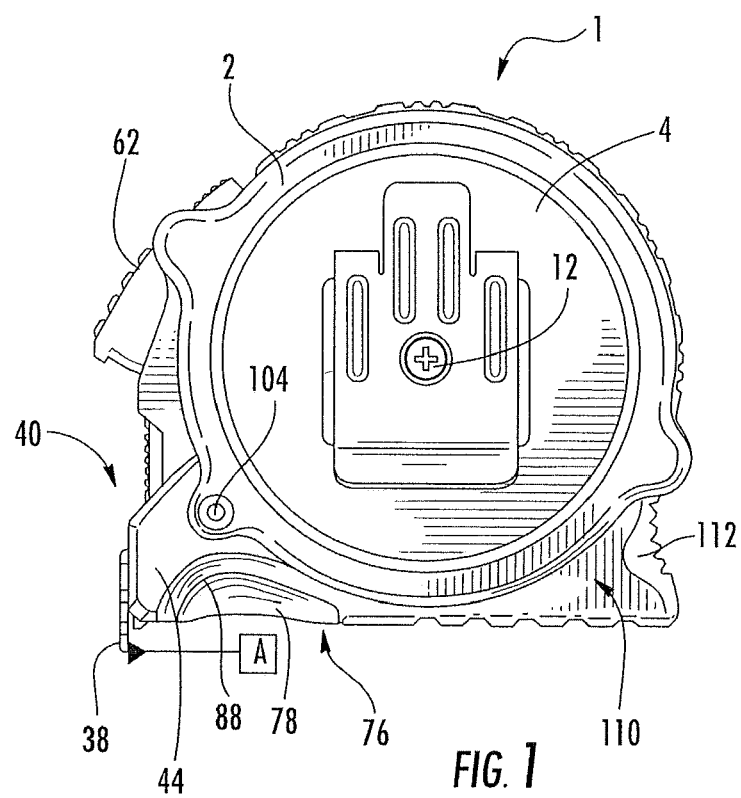
FIG. 1 is a front view of an embodiment of the tape measure of the invention.

Referring to FIGS. 1 and 5 through 8, the tape measure of the invention comprises a housing shown generally at 1 and comprising a first housing portion or housing base 2 having a face 4 terminating in a peripheral edge 6. A sidewall 8 extends from the edge 6 for a substantial portion of the periphery but for less than the entire periphery of the face 4 such that an open area 9 is created. The face 4 and sidewall 8 define an interior space 7 for receiving the tape as will hereinafter be described. Sidewall 8 includes a flange 11 extending around the periphery thereof for engaging the housing cover as will hereinafter be described.

The face 4 and sidewall 8 may be made of an integral piece of molded plastic. An aperture 10 is formed in face 4 for receiving a fastener 12 that supports reel 14 for rotational motion in housing 1.

Projecting from face 4 at the peripheral edge 6 are connecting elements 16, 20 and 23 that retain the fasteners that secure the housing base 2 to the housing cover 22. Specifically, an internally threaded post 16 extends from face 4 a first distance and receives a threaded fastener 18. A non-threaded post 20 extends from face 4 a second distance and abuts a threaded post 21 on cover 22 and receives threaded fastener 104. Finally, an internally threaded post 23 is formed in sidewall 8 for receiving threaded fastener 24. In the illustrated embodiment, post 23 is substantially flush with the outer edge of side wall 8. The posts 16, 20 and 23 are of different lengths such that the distal ends of the posts do not lie in a common plane. Thus, abutting connections or seams between these connecting elements and the opposed mating connecting elements on cover 22 are staggered across the width of the housing such that the seams do not lie in a common plane. While the illustrated embodiment shows the connecting elements as posts it is to be understood that the connecting elements that retain the fasteners may have configurations other than posts.

Tape 30 may include a steel blade having a generally concave-convex profile, a plastic or fiberglass ribbon or other relatively flexible material that can be wound on hub 28. Tape 30 includes measurement indicia 30a formed thereon as is known. Tape 30 may include an end hook 38 at the distal end thereof to facilitate the temporary attachment of the tape measure to an object during use and to prevent the tape from being completely rewound within the housing.

Figure 5:
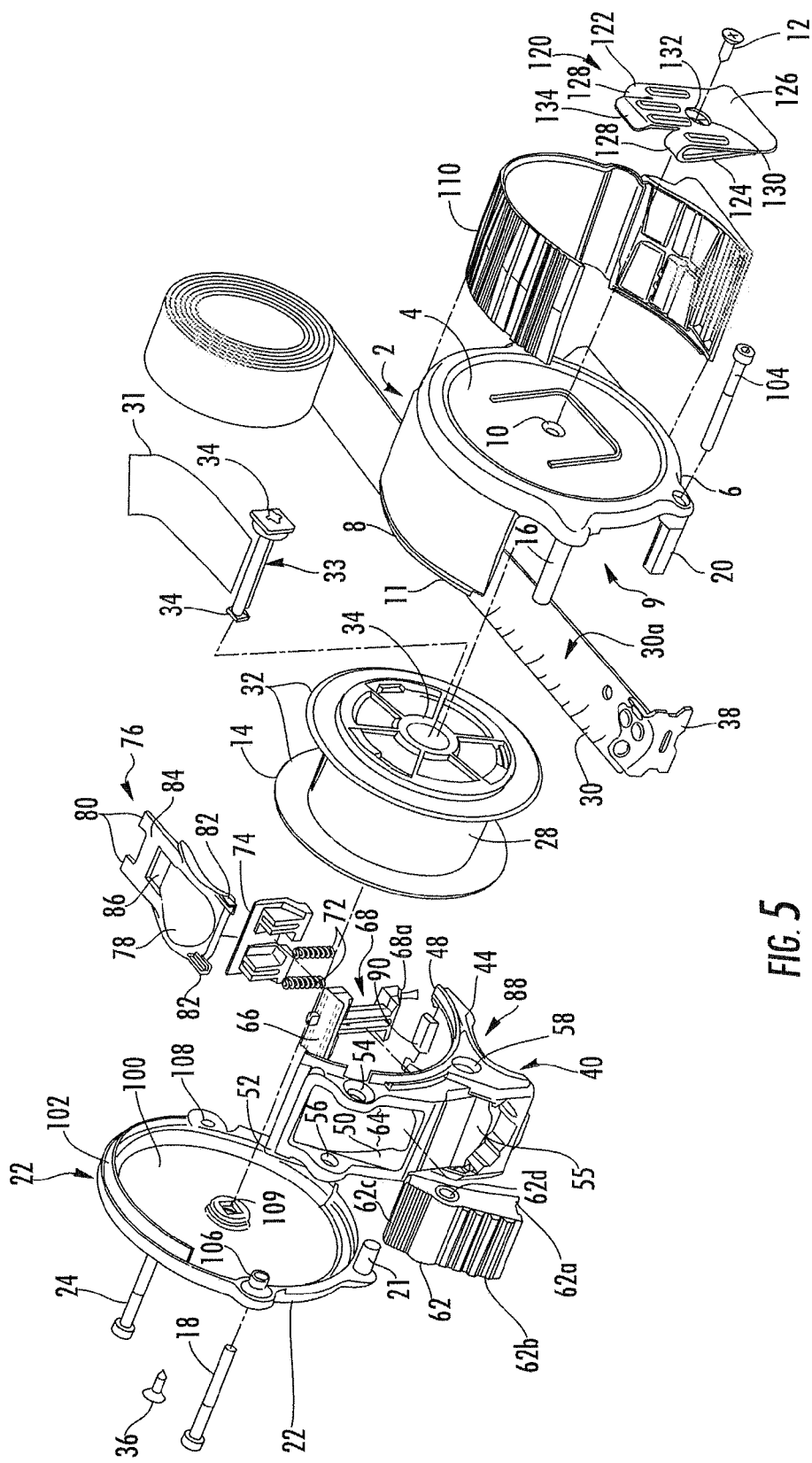
FIG. 5 is an exploded view of the embodiment of the tape measure shown in FIG. 1.
Figure 9:
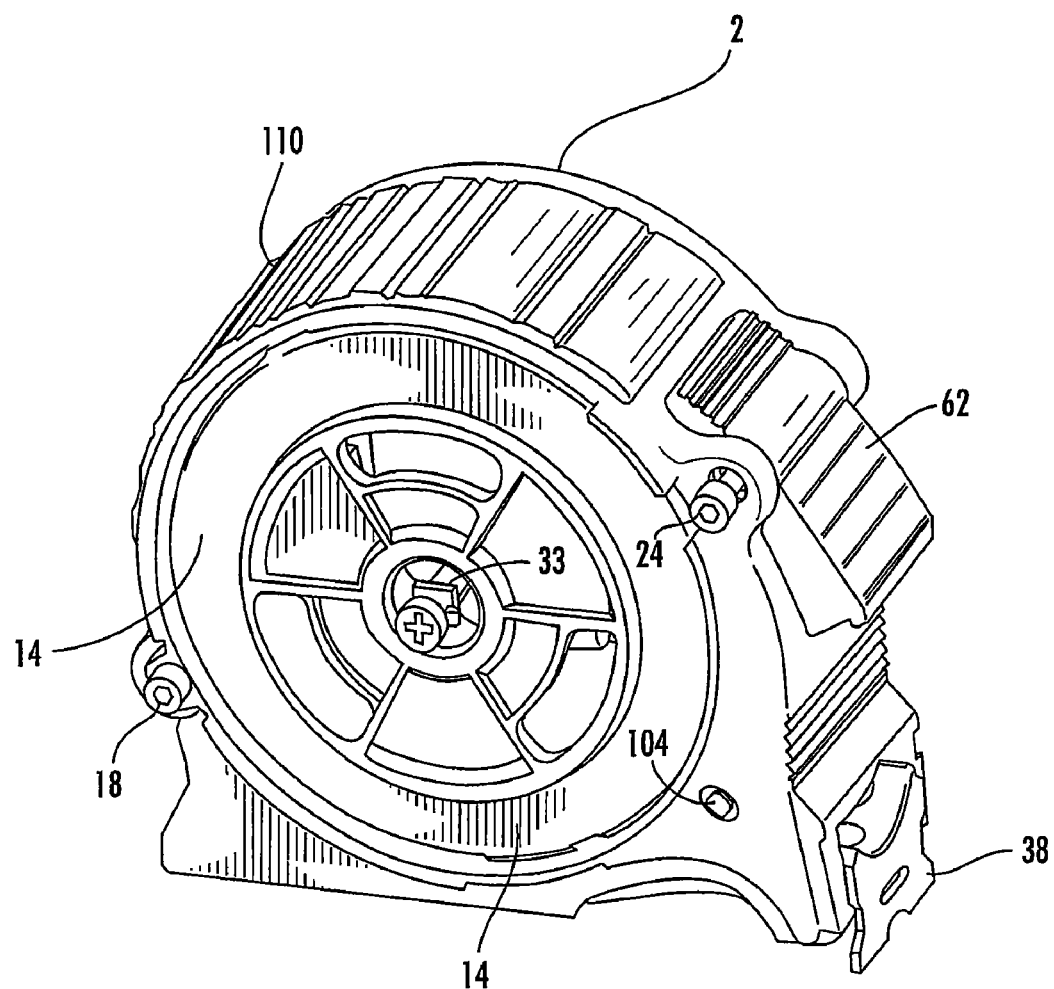
FIG. 9 is a perspective view of the tape measure shown in FIG. 1 with the housing cover removed.
Figure 10:
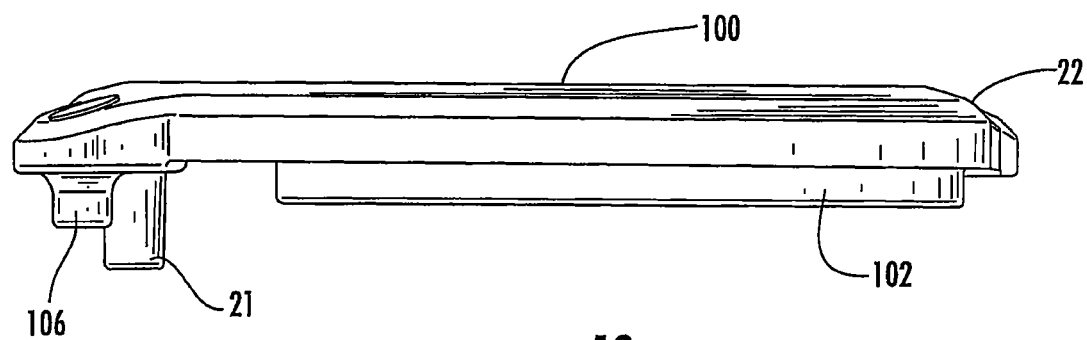
FIG. 10 is a top view of the housing cover.

Referring to FIGS. 5 and 9, reel 14 includes a central hub 28 on which a tape 30 is rotatably supported. Reel also includes a pair of upstanding walls 32 spaced to receive the tape therebetween to support and guide the tape onto the reel 26. A proximal end of the tape 30 is attached to the hub 28. An axle 33 is fixed to side wall 4 and cover 22. Axle 33 rotatably supports reel 14 such that reel 14 can rotate within housing 1. Threaded bores 34 are formed on the ends of axle 33 that are engaged by fasteners 12 and 36 to support the axle within housing 1.

A spring 31 is located in the hub 28 for automatically rewinding the tape measure back into the housing 1. The spring 31 may consist of a flat spring that is fixed between axle 33 and hub 28 and is arranged to store energy as the tape is manually unwound from the housing and to use the stored energy to rewind the tape 30 on reel 14 if no opposing forces are acting on the tape 30.

Referring to FIGS. 1 and 3 through 5, a housing front 40 includes a first side member 44 dimensioned and shaped to matingly engage the peripheral edge 6 of housing base 2 in open area 9. The side member includes a flange 48 that extends therefrom and overlaps with peripheral edge 6 to create a joint between the housing front 40 and housing base 2. A second side member 50 having the same basic configuration as side member 44 is arranged opposite side member 44 for engaging housing cover 4 as will hereinafter be described. The housing front 40 has the same width as side wall 8 such that when first side member 44 engages peripheral edge 6, the flange 52 of second side member 50 is coextensive with the flange 11 of side wall 8 such that flange 52 and flange 11 define a substantially closed peripheral edge of housing base 2. A tape opening 55 is formed in housing front 40 to receive the tape 30 and allow the tape to pass into and out of the housing 1.

Side member 44 and side member 50 include apertures 54 and 56, respectively, which are aligned with one another and receive post 16. Side member 44 includes aperture 58 and side member 50 includes a similarly located aperture (not visible in FIG. 5) that are aligned with one another and receive post 20. To assemble the housing front 40 on the housing base 2, posts 16 and 20 are inserted through the aligned pairs of apertures until flange 48 mates with peripheral edge 6.

A tape locking mechanism is also supported on housing front 40 and includes a finger actuator button 62 located in opening 64 formed between side members 44 and 50. Actuator button 62 includes a through hole 62d that is pivotably supported on post 16 such that it can pivot about post 16 relative to the housing. The end of actuator button 62 includes a finger 62a that engages a cam surface 66 of lock slide bar 68 such that when the lower portion 62b of actuator button 62 is depressed, finger 62a engages cam surface 66 to move the lock slide bar linearly from an unlocked position to a locked position where the lower end 68a of lock slide bar 68 is forced into engagement with tape 30. The engagement of lock slide bar 68 with tape 30 resists the return force of the return spring 31 to lock tape 30 in a desired extended position. Compression springs 72 are located between lock slide bar 68 and toggle plate 74 such that the springs return the lock slide bar 68 to a position disengaged from tape 30 when the upper portion 62c of actuator button 62 is depressed. Toggle plate 74 is supported on housing front 40 to support and guide lock slide bar 68 and to support compression springs 72.

A finger brake 76 is also supported on housing front 40. Finger brake 76 comprises an elongated plate having a finger button 78 formed in the center thereof and a pair of spring arms 80 extending from one side of the finger button. Retention clips 82 extend from the finger button 78 to the side opposite spring arms 80. A retention plate 84 extends between spring arms 80 to define an aperture 86 therebetween. Finger brake 76 is located in opening 88 formed in the bottom of housing front 40 such that it extends under, adjacent to and substantially parallel with the tape 30 in the area immediately adjacent tape aperture 55. Finger button 78 is disposed over opening 88 such that it is accessible by the user from the exterior of the housing 1. A flange 90 formed on the housing front 40 is inserted through aperture 86 to form a pivot allowing the finger brake 76 to pivot relative to the housing front 40. The retention clips 82 are located inside of opening 88 and abut the periphery of opening 88 to maintain the finger brake in the housing. In operation the finger brake 76 can be depressed by a user such that it pivots about flange 90 so that the inside surface of the finger button 78 contacts the bottom surface of tape 30. The finger button 78 applies a frictional force to the tape 30 that slows the retraction of the tape into the housing 1. The user can vary the force applied to the tape by finger brake 76 by varying the pressure applied to the finger brake such that the degree of braking on the tape 30 can be controlled, including stopping the retraction of the tape into the housing.

Referring to FIGS. 2 through 5 and 10, housing cover 22 includes a face 100 that is disposed substantially parallel to the face 4 of housing base 2. Face 100 is dimensioned and shaped so as to conform to the size and shape of face 4. A peripheral flange 102 extends from face 100 and is substantially coextensive with wall 8. A hole 109 is formed in face 100 for receiving fastener 36 to fix axle 33 in housing 1.

Figure 2:
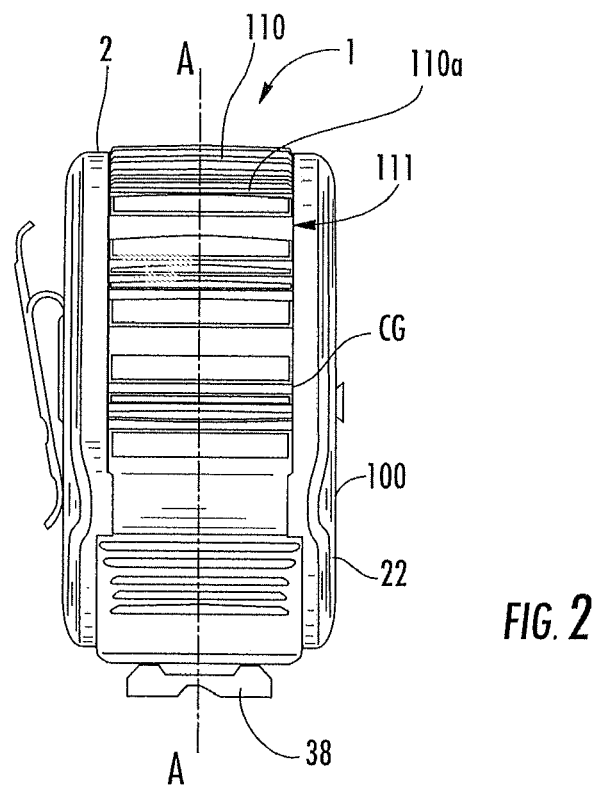
FIG. 2 is a right side view of the embodiment of the tape measure shown in FIG. 1.
Figure 3:
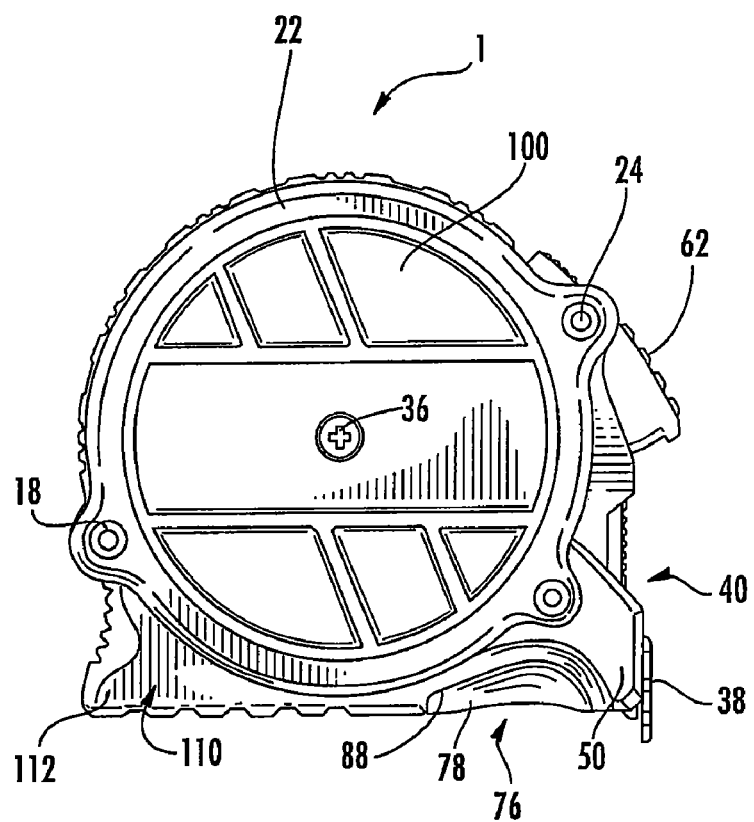
FIG. 3 is a back view of the embodiment of the tape measure shown in FIG. 1.
Figure 4:
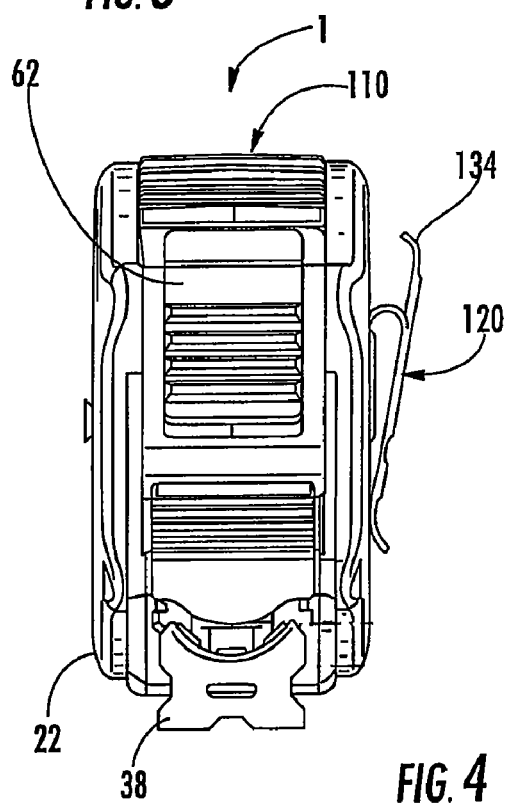
FIG. 4 is a left side view of the embodiment of the tape measure shown in FIG. 1.

Projecting from face 100 at the peripheral edge thereof are connecting elements 21, 106 and 108 that retain the fasteners that secure the housing base 2 to the housing cover 22. Specifically, post 21 extends from face 100 and includes a threaded bore that receives fastener 104. Post 21 is dimensioned such that it extends to and abuts post 20 of housing base 2. A post 106 having an internal bore is formed at the periphery of face 100 such that it is aligned with and abuts post 16 of housing base 2. Bore 106 receives fastener 18 that engages threads formed within post 16. A post 108 having an internal bore is formed on the periphery of face 100 that is aligned with and abuts post 23 formed on housing base 2. Post 108 receives fastener 24 that is threadably engaged with the threaded bore in post 23. in the illustrated embodiment, post 108 is substantially flush with the outer edge of side wall 8. The posts 21, 106 and 108 are of different lengths such that the distal ends of the posts do not lie in a common plane and abut posts 16, 20 and 23. Thus, the abutting interfaces of the connecting elements create seams that are staggered across the width of the housing. While the illustrated embodiment shows the connecting elements as posts it is to be understood that the connecting elements that capture the fasteners may have configurations other than posts. The securing of fasteners 18, 24 and 104 within the connecting members secures the housing base 2 to the housing cover 22 trapping the front housing 40 between the housing base and the housing cover. A joint or seam 111 is created between the housing cover 22 and housing base 2 that is off center of housing centerline A-A as best shown in FIG. 2.

The housing cover 22 may be made of aluminum or cast magnesium or other material that has a different material density than the molded plastic that forms face 4 of housing base 2. By making the housing cover 22 of a higher density material than the housing base 2, the housing 1 is asymmetrically weighted such that the center of gravity is located nearer to the face 100 than to face 4. Referring to FIG. 2, the centerline of housing 1 is shown at line A-A. The centerline as used herein defines the plane that extends through the physical midpoint of the housing roughly equal distance from the side faces of the housing. The center of gravity of the housing, represented by point CG in FIG. 2, is located between centerline A-A and face 100 of cover 22 such that it is offset from the center-line and is asymmetrically located on the housing. As a result, if the tape measure is dropped, it will rotate as is falls until the face 100 is oriented downward such that the tape measure will tend to land on face 100. The forces generated when the face 100 impacts a surface will be transmitted along the longitudinal axis of the connecting elements 16, 20, 23, 21, 106 and 108 and fasteners 18, 24 and 104. As a result shear forces acting on the connection or seam 111 between the housing base 2 and housing cover 22 will be minimized.

While locating the center of gravity of the housing in the predetermined asymmetric location has been described using different materials for the housing cover 22 than the housing base 2, it is to be understood that the center of gravity may be located by using separate weights supported within or on the housing or by selectively weighting other components. Moreover, the mass of the housing cover 22 may be increased or decreased by increasing or decreasing its thickness relative to the housing base in addition to or in place of using a different material.

It has also been determined that by making the seam 111 between the housing cover 22 and the housing base 2 off center from the centerline A-A of the housing, even if the housing is impacted at a surface other than face 100, the shear forces acting on the connection between the housing portions will be lessened and the failure of the housing is greatly reduced. Further by interlacing the housing base 2, housing cover 22 and housing front 40 using the posts 16 and 20 in engagement with the aligned apertures formed in the housing front 40, a very secure attachment between the housing components is achieved. By staggering the engagement of connecting members 21, 106 and 108 with connecting members 16, 20 and 23 such that they are not in a common plane, there is no shear plane that runs through all of the engagement points between the connecting members thereby strengthening the connection between the housing base and housing cover.

Figure 6:
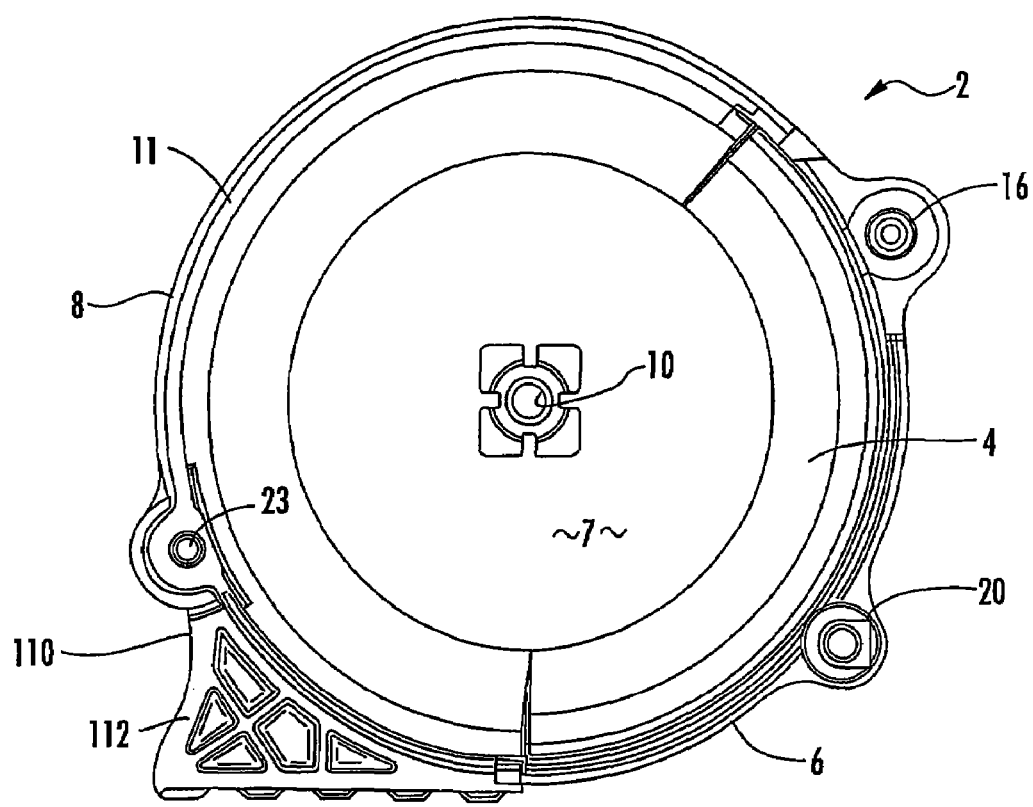
FIG. 6 is a front view of the housing base of the embodiment shown in FIG. 1.
Figure 7:
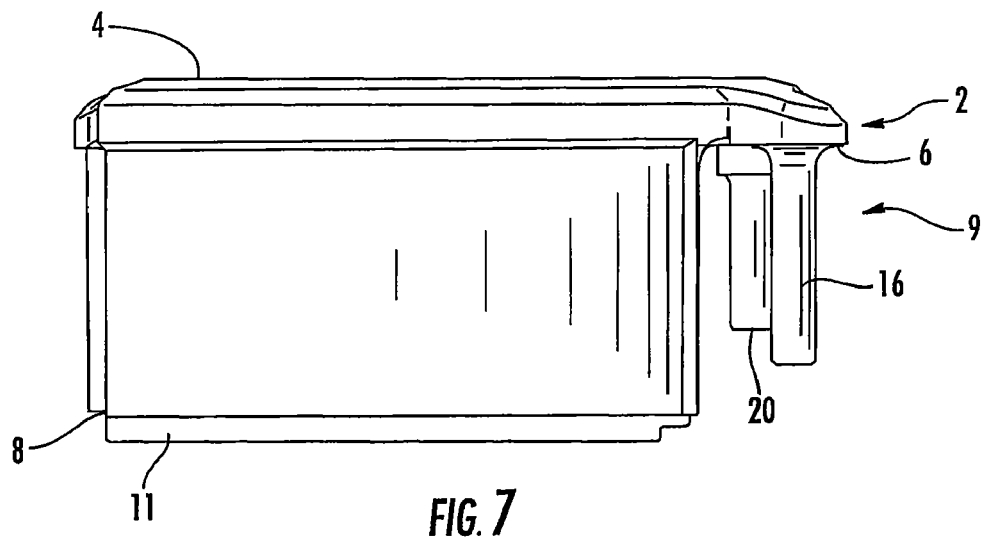
FIG. 7 is a top view of the housing base of the embodiment shown in FIG. 6.
Figure 8:
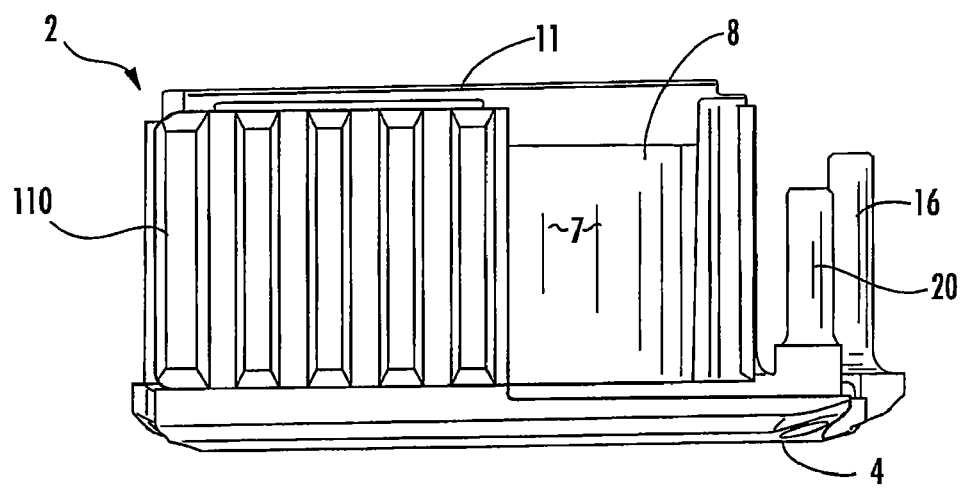
FIG. 8 is a bottom view of the housing base of the embodiment shown in FIG. 6.

To further protect the housing, a shock-absorbing sleeve 110 is provided. Sleeve 110 may be made of thermoplastic rubber or other shock absorbing material. Sleeve 110 may also be molded with a contoured outer surface 110a to increase its grip. Moreover, sleeve 110 may be molded with high impact resistant areas 112. In the illustrated embodiment the high impact area 112 is an area of the sleeve 110 that is made with an increased thickness as compared to the remainder of the sleeve. As best shown in FIG. 6 this increased thickness area 112 may be provided with a honeycombed or latticed interior structure that is well suited to absorbing impact. The high impact areas of increased thickness may be provided on those areas of the housing that are most susceptible to damage and/or are most likely to be impacted. In this regard, the high impact areas may be combined with a predetermined location of the center of gravity such that the housing will orient itself if dropped so as to impact the high impact areas 112.

To assemble the tape measure of the invention, the return spring 31 is located within the reel 14 and one end is attached to axle 33 and the other end is attached to reel 14. This may be accomplished by forming the reel 14 of two separate components that are joined together after the spring is located within the hub 28. The tape 30 is then wound on the hub 28 with its distal end projecting therefrom.

The front housing assembly 40 is assembled by mounting the locking mechanism and finger brake on the housing front 40 as previously described. The distal end of the tape is threaded through opening 55 in housing front 40. The end hook 38 may be mounted on the tape prior to the tape 30 being wound on the housing 14, and the tape 30 with the end hook 38 mounted thereon is threaded through opening 55. Once the tape reel 14, tape 30 and housing front 40 are united, these components are mounted on the housing base 2. Specifically, the reel 14 and tape 30 are located in interior space 7 and posts 16 and 20 are inserted through the mating pairs of holes in front housing 40. Post 16 is also inserted through hole 62d in actuator button 62.

Housing cover 22 is attached to housing base 2 using fasteners 18, 24 and 108. As the fasteners are tightened the peripheral edge of housing cover 22 is brought in tight engagement with the peripheral edge of housing base 2 and the flange 52 of front housing 40. Flanges 11 and 102 overlap to create a seal that isolates the interior of the housing from the external environment. Posts 16, 20 and 23 are also brought into tight engagement with posts 21, 106 and 108. Housing front 40 is trapped between the peripheral edges of housing cover 22 and housing base 2 and is also retained by posts 16 and 20. Fasteners 12 and 36 are secured in apertures 10 and 109 and engage threaded openings 34 in the ends of axle 33 to rotatably support the reel 14 in the housing.

In the illustrated embodiment the fastener 12 is also used to retain a belt clip 120 on the housing allowing the tape measure to be secured to a user's belt or the like. The belt clip 120 consists of a single piece of flexible material 122 folded over on itself to create a first, inner leg 124 and a second, outer leg 126 that overlay each other and are joined by living hinge 128. Fastener 12 engages an aperture 130 formed in the inner leg 124 to retain the clip 120 on the housing 1. An aperture 132 may also be formed in the outer leg 126 such that the fastener 12 can be accessed by a driver tool such as a screwdriver. An actuating lever 134 is formed as a part of the outer leg 126 such that a force applied to the lever towards housing 1 will cause the distal end of the outer leg 126 to separate from the inner leg 124 allowing the clip to be inserted on or removed from a support such as a belt. Releasing the lever 134 allows the living hinge 128 to move the outer leg 126 back towards the inner leg 124. In one embodiment the clip 120 is made of a unitary piece of material such as steel where the screw apertures 130 and 132 and lever 134 are punched from the unitary piece of material. The material is then bent into the final shape. The clip 120 may also be molded out of plastic.

Specific embodiments of an invention are disclosed herein. One of ordinary skill in the art will recognize that the invention has other applications in other environments. Many embodiments are possible. The following claims are in no way intended to limit the scope of the invention to the specific embodiments described above.

The invention claimed is:

1. A tape measure comprising:
a tape wound within a housing about a central axis, said housing including a first housing portion including a first face generally perpendicular to the central axis, a sidewall extending generally parallel to the central axis from said first face, and a first flange extending from said sidewall generally parallel to the central axis, and a second housing portion including a second face generally perpendicular to the central axis and a second flange extending generally parallel to the central axis from said second face, said sidewall and said first flange opposing said second flange, wherein said first flange and said second flange engage such that said first housing portion and said second housing portion join together to form a seam to encase said tape, said seam being asymmetrically disposed on said housing.

2. The tape measure of claim 1 further including a third housing portion, said third housing portion defining an opening for receiving said tape.

3. The tape measure of claim 1 wherein said second face is substantially parallel to said first face, and said seam is adjacent to said second face.

4. The tape measure of claim 1 means for securing said first housing portion to said second housing portion.

5. The tape measure of claim 1 wherein said housing has a centerline, said seam being located a distance spaced from said centerline.

6. The tape measure of claim 1 further including connecting members on the first housing portion and said second housing portion that abut one another at seams that are staggered across the width of the housing along longitudinal axes parallel to the central axis.

7. The tape measure of claim 6 wherein said connecting members retain fasteners.

8. The tape measure of claim 2 wherein said first housing portion includes a first member that extends through said third housing portion.

9. The tape measure of claim 2 wherein said third housing portion is trapped between said first housing portion and said second housing portion.

10. The tape measure of claim 2 further including a fastener engaged with said first housing portion, said second housing portion and said third housing portion.

11. A tape measure comprising:
a tape wound within a housing about a central axis, said housing exterior being generally symmetrical about a central plane passing therethrough perpendicular to the central axis and having its center of gravity disposed such that the housing will tend to fall in a predetermined orientation.

12. The tape measure of claim 11 wherein said center of gravity is located such that said housing will tend to fall on a face of said housing.

13. The tape measure of claim 11 wherein said housing comprises a first housing portion and a second housing portion connected at a seam, said face being disposed parallel to said seam.

14. The tape measure of claim 11 wherein said housing comprises a first housing portion and a second housing portion connected by at least one fastener, said face being disposed perpendicular to said at least one fastener.

15. The tape measure of claim 11 wherein said housing is constructed of two different materials, said different materials being used to locate the center of gravity.

16. The tape measure of claim 11 said housing including a first face and a second face, said center of gravity being located closer to said first face than to said second face.

17. The tape measure of claim 11 further including a shock absorbent sleeve disposed on the outside of the housing.

18. The tape measure of claim 17 wherein said shock absorbent sleeve include a relatively more shock absorbent portion.

19. The tape measure of claim 18 wherein said relatively more shock absorbent portion is located at a predetermined location relative to said center of gravity.

20. The tape measure of claim 15 wherein a first portion of the housing is made of plastic and a second portion of the housing is made of metal.

21. A tape measure comprising:
a tape wound within a housing about a central axis, said housing including a first housing portion including a first face generally perpendicular to the central axis, a sidewall extending generally parallel to the central axis from said first face, and a first flange extending from said sidewall generally parallel to the central axis, and a second housing portion including a second face generally perpendicular to the central axis and a second flange extending generally parallel to the central axis from said second face, said sidewall and said first flange opposing said second flange, wherein the said first flange and said second flange engage such that the said first housing portion and the said second housing portion join together to form a seam to encase the said tape, wherein said housing is generally symmetrical about a central plane passing therethrough perpendicular to the central axis and has its center of gravity disposed such that the housing will tend to fall in a predetermined orientation.

22. A tape measure comprising:
a tape wound within a housing about a central axis, said housing including a first housing portion including a first face generally perpendicular to the central axis, a sidewall extending generally parallel to the central axis from said first face, and a first flange extending from said sidewall generally parallel to the central axis, and a second housing portion including a second face generally perpendicular to the central axis and a second flange extending generally parallel to the central axis from said second face, said sidewall and said first flange opposing said second flange, wherein said first flange and said second flange engage such that said first housing portion and said second housing portion join together to form a seam to encase said tape, wherein said housing has its center of gravity disposed such that the housing will tend to fall in a predetermined orientation.

23. A tape measure comprising:
a tape wound within a housing, said housing including a first housing portion and a second housing portion, wherein the first housing portion and the second housing portion join together to form a seam to encase the tape,
wherein said housing is generally symmetrical about a central plane passing therethrough perpendicular to the central axis and has its center of gravity disposed such that the housing will tend to fall in a predetermined orientation.

* * * * *

UNITED STATES PATENT AND TRADEMARK OFFICE
CERTIFICATE OF CORRECTION

```
PATENT NO.        : 7,377,050 B2                                        Page 1 of 1
APPLICATION NO.   : 11/278464
DATED             : May 27, 2008
INVENTOR(S)       : Matthew Shute et al.
```

It is certified that error appears in the above-identified patent and that said Letters Patent is hereby corrected as shown below:

Claim 21
Col. 8 Line 18, delete the word "the" - second word from the end.

Col. 8 Line 19, delete the word "the" at the end of the line.

Col. 8, Line 20, delete the "the" - sixth word in the line.

Col. 8, Line 21, delete the "the" - second word from the end.

Signed and Sealed this

Second Day of September, 2008

JON W. DUDAS
*Director of the United States Patent and Trademark Office*